United States Patent
Pham Gia et al.

(10) Patent No.: US 7,265,357 B2
(45) Date of Patent: Sep. 4, 2007

(54) PROCESS FOR PRODUCING A SCINTILLATOR LAYER FOR AN X-RAY DETECTOR, AND SCINTILLATOR LAYER

(75) Inventors: Khanh Pham Gia, Munich (DE); Wolfgang Rossner, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/283,714

(22) Filed: Nov. 22, 2005

(65) Prior Publication Data

US 2006/0226370 A1   Oct. 12, 2006

(30) Foreign Application Priority Data

Nov. 25, 2004 (DE) ........................ 10 2004 056 999

(51) Int. Cl.
   *G01T 1/20* (2006.01)
(52) U.S. Cl. .................. 250/370.11; 250/370.09; 250/367; 250/368
(58) Field of Classification Search .......... 250/370.11, 250/370.09, 367, 368
   See application file for complete search history.

(56) References Cited

U.S. PATENT DOCUMENTS

| | | | |
|---|---|---|---|
| 4,680,231 A * | 7/1987 | Yamaura et al. | 428/407 |
| 5,149,971 A * | 9/1992 | McElhaney et al. | 250/361 R |
| 5,391,879 A * | 2/1995 | Tran et al. | 250/367 |
| 5,877,504 A * | 3/1999 | Yanagita et al. | 250/484.4 |
| 6,177,236 B1 * | 1/2001 | Apte | 430/320 |
| 6,255,660 B1 * | 7/2001 | Isoda et al. | 250/484.4 |
| 6,552,348 B2 * | 4/2003 | Cherry et al. | 250/363.03 |
| 6,784,432 B2 | 8/2004 | Wieczorek | |
| 7,019,297 B2 * | 3/2006 | Aykac et al. | 250/368 |

FOREIGN PATENT DOCUMENTS

| | | |
|---|---|---|
| DE | 199 30 645 A1 | 1/2001 |
| DE | 100 58 810 A1 | 6/2002 |
| EP | 0 126 564 A2 | 11/1984 |
| EP | 1550885 A1 * | 7/2005 |

OTHER PUBLICATIONS

Kleinmann et al. "An X-ray Imaging Pixel Detector Based on a Scintillating Guides Screen", IEEE Transactions on Nuclear Science, vol. 47, No. 4, Aug. 2000.*
King, Burnham, Effect of Particale Size and Index of Refraction on Reflectance, (1940), Journal of the American Ceramic Society, vol. 23, No. 8, pp. 221-225.*
Freeform Fabrication of Ceramics via Stereolithography (Michelle L. Griffith and John W. Halloran) J.Am.Ceram.Soc. 79(10), 2601-2608; 1996 2004Q19357.
Rapid Prototyping Technology—New potentials for offshore and abyssal engineering (Burghilde M. Wieneke-Toutaoui and Hans W. Gerber) Paper Nr. 2003—JSC-314 2004Q19358.
German Office Action issue Jul. 20, 2005.

* cited by examiner

Primary Examiner—David Porta
Assistant Examiner—Christine Sung
(74) Attorney, Agent, or Firm—Harness, Dickey & Pierce, P.L.C.

(57) ABSTRACT

A scintillator layer is disclosed for a spatially resolving X-ray detector. Apertures provided in a plate and in the form of a grid, are filled with a filling compound formed from a polymer and a phosphor powder.

31 Claims, 1 Drawing Sheet

PROCESS FOR PRODUCING A SCINTILLATOR LAYER FOR AN X-RAY DETECTOR, AND SCINTILLATOR LAYER

The present application hereby claims priority under 35 U.S.C. §119 on German patent application number DE 10 2004 056 999.1 filed Nov. 25, 2004, the entire contents of which is hereby incorporated herein by reference.

FIELD

The invention generally relates to a process for producing a scintillator layer for an X-ray detector and/or to a scintillator layer.

BACKGROUND

The prior art has disclosed what are known as flat-panel image detectors for the detection of X-rays. Flat-panel image detectors of this type are used in particular in digital radiography. Flat-panel image detectors have a scintillator layer produced, for example, from CsI:Tl or from $Gd_2O_2S$:Tb, which has been applied to a photodiode array formed from photodiodes.

To achieve a desired image resolution, the scintillation light should be recorded only by that photodiode which is located precisely vertically beneath the position at which the scinitillator light is generated. In practice, however, depending on the formation of the microstructure of the scintillator layer, more or less pronounced crosstalk occurs in the scintillation light from the position at which it is generated to adjacent photodiodes. To improve the spatial resolution of flat-panel image detectors of this type, it is desirable to reduce or even minimize the crosstalk.

Scintillator layers produced from $Gd_2O_2S$:Tb are homogenous and laterally unpatterned in form. They are generally approximately 200 μm thick. To prevent extensive lateral propagation of the scintillation light, it has been attempted to reduce the thickness of the scintillator layer. However, this in turn disadvantageously leads to the X-radiation which is incident on the scintillator layer not being completely absorbed, which has an adverse effect on the quantum efficiency of a flat-panel image detector of this type.

Scintillator layers produced from CsI:Tl generally include fine acicular crystals which are oriented parallel to the direction of incidence of the X-radiation and have a diameter of generally from 5 μm to 10 μm. The scintillation light which is generated in such crystals generally propagates in accordance with the orientation of the crystal and is to a large extend transmitted to the photodiode below. Nonetheless, in this case too, crosstalk of some of the scintillation light with adjacent photodiodes occurs. Finally, scintillator layers produced from CsI:Tl have the drawback of being hygroscopic, and consequently they have to be effectively protected from atmospheric humidity.

SUMMARY

It is an object of at least one embodiment of the invention to reduce or even eliminate at least one of the drawbacks of the prior art. In at least one embodiment, it is intended to specify a process for producing a scintillator layer and/or a scintillator layer produced by this process, by which undesirable lateral propagation of scintillation light can be securely and reliably avoided.

At least one embodiment of the invention provides a process for producing a scintillator layer for an X-ray detector comprising:

a) providing a plate having a multiplicity of apertures arranged in the form of a grid,
b) producing a filling compound by mixing a free-flowing polymer with a phosphor powder,
c) filling the apertures with the filling compound and
d) curing the polymer.

The proposed process makes it possible to produce a scintillator layer in which the lateral propagation of the scintillation light is restricted to the diameter of the apertures provided in the plate. The diameter can be adapted to the particular requirements. With conventional techniques, it is readily possible to produce plates with apertures with a diameter in the region of the size of a photodiode produced on a substrate using semiconductor technology. The proposed process is relatively simple and inexpensive to carry out. The scintillator layer produced is robust. In particular, it is not sensitive to environmental influences, in particular atmospheric humidity.

According to an advantageous configuration of at least one embodiment of the process, the plate is made from a plastic, preferably an epoxy resin. In this case, the plate can be produced by selective laser curing of a light-curing plastic layer followed by removal of the uncured regions. In this context, it is possible to make use of known processes, for example the stereolithography (SLA) process. Reference is made, for example, to Wieneke et al., "Rapid Prototyping Technology—New potentials for offshore and abyssal engineering", Paper No. 2003-JSC-314, the entire contents of which are incorporated herein by reference.

According to a further configuration, it is also possible for the plate to be made from metal or ceramics. In this context, reference is made, for example, to Griffith et al., "Freeform Fabrication of Ceramics via Stereolithography", J. Am. Ceram. Soc. 79(10), 2601-2608 (1996), the entire contents of which are incorporated herein by reference.

Prior to step c), in one example of at least one embodiment, it is expedient for the plate to be coated with a reflective layer at least in the region of the inner walls which face the apertures. A reflective layer of this type may be applied in particular if the plate is made from a material which has a poor reflectivity for light, such as plastic or ceramic. This type of reflective layer can be produced, for example, by the vapor deposition of metal.

The plate expediently has a thickness of from 0.5 to 5.0 mm, preferably from 1.0. to 3.0 mm. This type of thickness makes it possible to produce a scintillator layer which is suitable for use in X-ray detectors. A sufficient quantity of filling compound can be held therein—depending on the profile of requirements—and consequently it is possible to ensure a light signal characteristic which is required for the respective application.

According to a further example configuration, the apertures have a mean diameter of from 5 to 300 μm, preferably from 50 to 200 μm. A plate with apertures which have a diameter of this type makes it possible to produce an X-ray detector with a considerably improved image resolution.

The polymer used is expediently a wax and/or another epoxy resin. If wax is used, the polymer can simply be brought into a free-flowing state by increasing the temperature. In this case, curing is effected simply by cooling the polymer to room temperature. If the polymer used is epoxy resin, the curing can be brought about by adding a chemical substance which effects curing or by physical influences, for example irradiation with light of a predetermined wavelength, increasing the temperature and the like.

Furthermore, it has proven expedient for the filling compound to contain at least 70% by mass of phosphor powder.

This corresponds approximately to a proportion of at least 40% by volume. Above a level of 70% by mass, efficient light conduction in the filling compound is achieved. Then, a high proportion of the scintillation light generated in the filling compound is emitted. The light conduction in the filling compound can be further increased by using phosphor power which is as coarse-grained as possible. In this context, however, the maximum grain diameter should be selected in such a way as to always ensure perfect filling of the apertures with the filling compound, i.e. the maximum grain diameter of the phosphor powders should under no circumstances be larger than the diameter of the apertures. It is expediently a multiple smaller than the diameter of the apertures. For example, the ratio of the maximum grain diameter to the diameter of the apertures may be in the range from 1:10 to 1:20.

Furthermore, it has proven expedient to use a polymer with a refractive index n of more than 1.6, preferably more than 1.7. For this purpose, by way of example, it is possible for a further power to be added to a conventional polymer with a refractive index n of less than 1.6, in order to increase this refractive index. In this context, it has proven particularly advantageous for the filling compound to contain from 0.5 to 2.0% by mass of a further powder, preferably formed from $TiO_2$, which has a refractive index n of more than 2.0. The further powder advantageously has a mean grain diameter of from 10 to 30 nm, in particular from 15 to 25 nm.

The abovementioned features allow the refractive index of the polymer to be matched to the refractive index of the phosphor powder, so as to achieve particularly efficient conduction of light within the filling compound. The proposed mean grain diameter of the further powder contributes to minimizing light-scattering effects in the filling compound.

According to a further advantageous configuration of at least one embodiment, it is provided that the phosphor powder is a metal oxysulfide of the general empirical formula $(M_{1-x}Ln_x)_2O_2S$, where M is at least one of the following elements: Gd, La, Lu, Y, and Ln is at least one of the following elements: Eu, Pr, Ce, Tb, Dy, Ho, Sm, Yb, Nd, Er or Tm. Phosphor powders of this type are distinguished by a particularly high light yield and by a short phosphorescence. They are suitable in particular for producing flat-panel image detectors for the detection of X-rays.

To produce an X-ray detector, the scintillator layer according to at least one embodiment of the invention can be applied to a substrate provided with a photodiode array. In this case, the grid formed from the apertures may be designed to correspond to the photodiode array, i.e., by way of example, each aperture can be assigned a photodiode. However, it is also possible for in each case a predetermined group of apertures, for example 2, 4, 6 or 8 apertures, to be assigned to a single photodiode. The grid formed by the apertures and the further grid formed by the photodiode array are expediently substantially congruent, in which case the number of corresponding grid areas may also differ from one another by an integer multiple.

At least one embodiment of the invention also provides a scintillator layer for a spatially resolving X-ray detector, in which apertures which are provided in a plate and are in the form of a grid are filled with a filling compound formed from a polymer and a phosphor powder. A scintillator layer of this type is suitable in particular for the production of X-ray detectors with a particularly good image resolution. Reference is made to the statements given above for details of the advantageous configurations of the scintillator layer. The features described therein can likewise, mutatis mutandis, form advantageous configurations of embodiments of the scintillator layer.

BRIEF DESCRIPTION OF THE DRAWINGS

The text which follows provides a more detailed explanation of example embodiments of the invention with reference to the drawings, in which.

DETAILED DESCRIPTION OF THE EXAMPLE EMBODIMENTS

Figure 2:
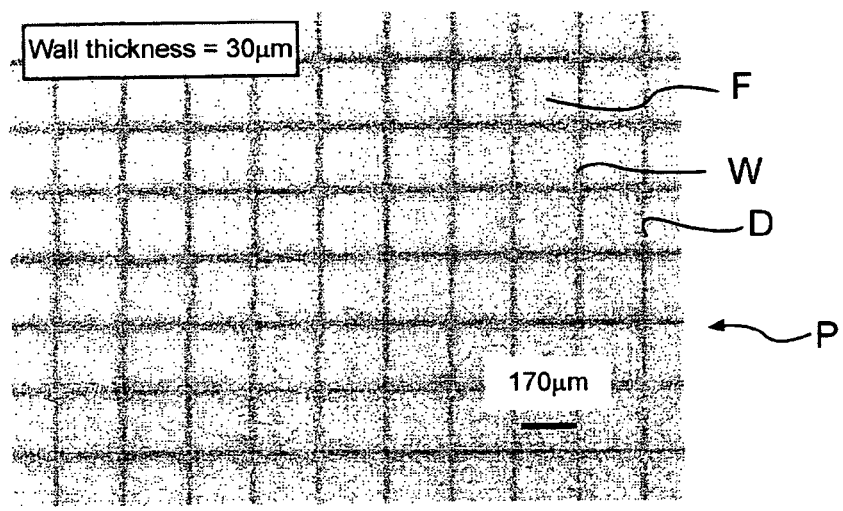
FIG. 2 shows a scanning electron microscope image of a first scintillator layer.

A plastic plate P made from epoxy resin is used to produce the first scintillator layer shown in FIG. 2. The plastic plate P has a thickness of 2 mm and external dimensions of 20×20 mm. The apertures D are substantially square in form. Their opening surface area has an edge length of approximately 170×170 μm. The apertures D are separated from one another by walls W, the wall thickness of which is approximately 30 μm. A plastic plate P of this type is produced in a conventional way, for example by use of stereolithography.

Figure 1:
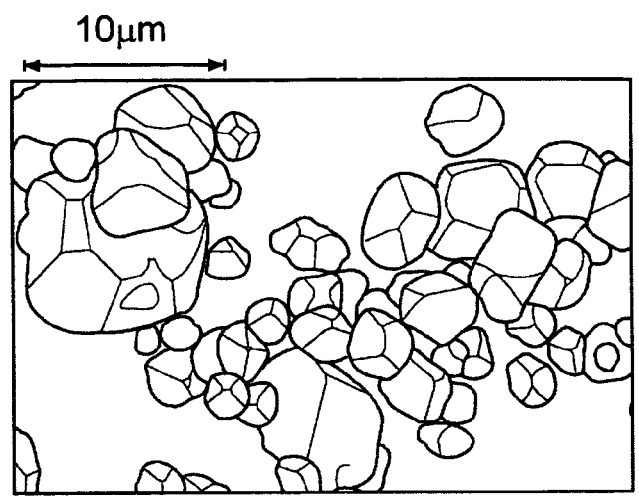
FIG. 1 shows a scanning electron microscope image of a $Gd_2O_2S$ phosphor powder.

By way of example the $Gd_2O_2S$ phosphor powder shown in FIG. 1 is used to produce a filling compound F. As can be seen from FIG. 1, the $Gd_2O_2S$ phosphor powder has a maximum grain diameter of approximately 10 μm. Paraffin wax (produced by Merck) is liquefied at 80 to 100° C. and $Gd_2O_2S$ phosphor powder with a mean grain size of approximately 21 nm is added. The quantitative ratios in the filling compound F are set in such a way that the $Gd_2O_2S$ phosphor powder forms approximately 70% by mass and the paraffin wax forms approximately 30% by mass.

To achieve a particularly good dispersion of the phosphor powder in the paraffin wax, it is possible for the mixing operation to be carried out in a heated ball mill. Surfactants, for example stearic acid, oleic or fatty acid, aminamides and the like can also be added to further assist with dispersion, in a quantity of approximately 1 to 5% by mass, based on the solid fraction. The apertures D are then filled with the free-flowing filling compound F produced in this way. The filling of the apertures D expediently takes place in vacuo in order to avoid the inclusion of air bubbles.

Figure 3:
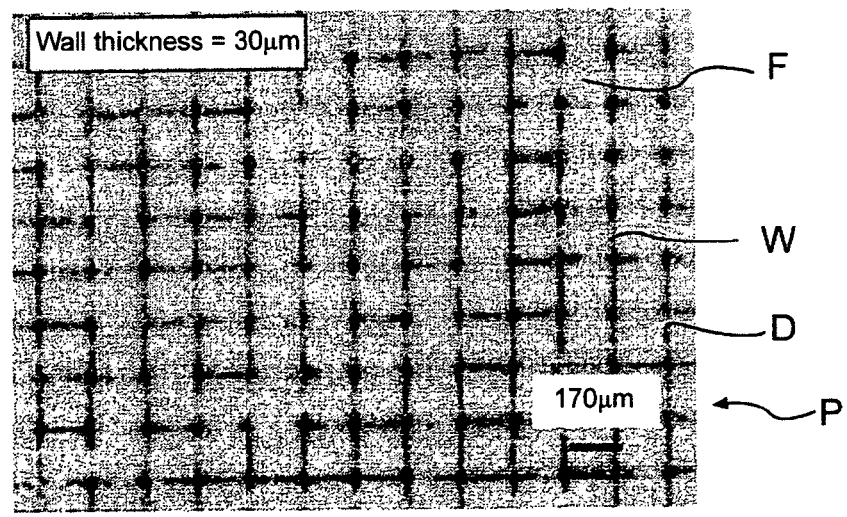
FIG. 3 shows a scanning electron microscope image of a second scintillator layer.

The second scintillator layer, shown in FIG. 3, is produced in a similar way to the first scintillator layer shown in FIG. 2. In this case too, the $Gd_2O_2S$ phosphor powder forms approximately 70% by mass. Unlike in the case of the first scintillator layer shown in FIG. 2, however, in this case a quantity of 0.5% by mass of a $TiO_2$ powder (produced by Degussa) has additionally been added. The $TiO_2$ powder has a mean grain size of 21 nm. The paraffin wax content was in this case approximately 29.5% by mass. The addition of $TiO_2$ powder proposed for the second scintillator layer leads to an improved light yield.

As can be seen from FIGS. 2 and 3, the area of the apertures D which has been filled with the filling compound F amounts to approximately 72% of the area of the scintillator layer. Only 28% of the area of the scintillator layer is filled by the walls W.

A scintillator layer produced in this way can be adhesively bonded to a suitable photodiode array (not shown here), for example by use of an epoxy resin. An X-ray detector produced has an excellent image resolution.

Of course, it is also possible to use a different polymer instead of the paraffin wax to produce the filling compound F. Transparent curable plastic compounds are suitable.

The plate may also be made from metal or ceramic instead of plastic. In this case, it is also possible for glass to be used as polymer for producing the filling compound F.

To increase the output of light, it has proven particularly advantageous for in particular plates made from plastic or ceramic to be provided in addition with a reflective layer. This may, for example, be a layer formed from metal which is produced by vapor deposition. The reflective layer is applied in particular to the inner sides of the walls W which face the apertures D. It is used to reflect scintillation light formed in the filling compound F. The output of light from the filling compound F can be increased further by producing a reflective layer of this type.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process for producing a scintillator layer for an X-ray detector,
comprising:
providing a plate having a multiplicity of apertures arranged in the form of a grid;
producing a filling compound by mixing a free-flowing polymer with a phosphor powder, wherein the filling compound contains at least 70% by mass of the phosphor powder and additionally contains from 0.5 to 2% by mass of a further powder having a refractive index n of more than 2.0;
filling the apertures with the filling compound; and
curing the polymer.

2. The process as claimed in claim 1, wherein the plate is made from a plastic.

3. The process as claimed in claim 1, wherein the plate is produced by selective laser curing of a light-curing plastic layer, followed by removal of the uncured regions.

4. The process as claimed in claim 1, wherein the plate is made from at least one of metal and ceramic.

5. The process as claimed in claim 1, wherein the plate, prior to filling, is coated with a reflective layer at least in the region of the inner walls which face the apertures.

6. The process as claimed in claim 1, wherein the plate has a thickness of from 0.5 to 5.0 mm.

7. The process as claimed in claim 1, wherein the apertures have a mean diameter of from 5 to 300 µm.

8. The process as claimed in claim 1, wherein the polymer used is at least one of a wax and another epoxy resin.

9. The process as claimed in claim 1, wherein a polymer with a refractive index n of more than 1.6 is used.

10. The process as claimed in claim 1, wherein the further powder has a mean grain diameter of from 10 to 30 nm.

11. The process as claimed in claim 1, wherein the phosphor powder used is a metal oxysulfide of the general empirical formula $(M_{1-x}Ln_x)_2O_2S$, where M is at least one of the following elements: Gd, La, Lu, Y, and Ln is at least one of the following elements: Eu, Pr, Ce, Tb, Dy, Ho, Sm, Yb, Nd, Er or Tm.

12. A process for producing an X-ray detector, comprising applying the scintillator layer produced as described in claim 1, to a substrate provided with a photodiode array.

13. The process as claimed in claim 1, wherein the plate is made from an epoxy resin.

14. The process as claimed in claim 1, wherein the plate has a thickness of from 1.0 to 3.0 mm.

15. The process as claimed in claim 1, wherein the apertures have a mean diameter of from 50 to 200 µm.

16. The process as claimed in claim 1, wherein a polymer with a refractive index n of more than 1.7 is used.

17. The process as claimed in claim 1, wherein the filling compound contains from 0.5 to 2.0% by mass of a further powder, formed from $TiO_2$ having a refractive index n of more than 2.0.

18. The process as claimed in claim 1, wherein the further powder has a mean grain diameter of from 15 to 25 nm.

19. A scintillator layer for an X-ray detector in which apertures provided in a plate and in the form of a grid, are filled with a filling compound formed from a polymer and a phosphor powder wherein the filling compound contains at least 70% by mass of the phosphor powder and additionally contains from 0.5 to 2% by mass of a further powder having a refractive index n of more than 2.0.

20. The scintillator layer as claimed in claim 19, wherein the plate is made from a plastic, preferably an epoxy resin.

21. The scintillator layer as claimed in claim 19, wherein the plate is produced by selective laser curing of a light-curing plastic layer followed by removal of the uncured regions.

22. The scintillator layer as claimed in claim 19, wherein the plate is made from at least one of metal and ceramic.

23. The scintillator layer as claimed in claim 19, wherein the plate is coated with a reflective layer at least in the region of the inner walls which face the apertures.

24. The scintillator layer as claimed in claim 19, wherein the plate has a thickness of from 0.5 to 5.0 mm.

25. The scintillator layer as claimed in claim 19, wherein the apertures have a mean diameter of from 5 to 300 µm.

26. The scintillator layer as claimed in claim 19, wherein the polymer is at least one of a wax and another epoxy resin.

27. The scintillator layer as claimed in claim 19, wherein a polymer with a refractive index n of more than 1.6 is used.

28. The scintillator layer as claimed in claim 19, wherein the further powder has a mean grain diameter of from 10 to 30 nm.

29. The scintillator layer as claimed in claim 19, wherein the phosphor powder used is a metal oxysulfide of the general empirical formula $(M_{1-x}Ln_x)_2O_2S$, where M is at least one of the following elements: Gd, La, Lu, Y, and Ln is at least one of the following elements: Eu, Pr, Ce, Tb, Dy, Ho, Sm, Yb, Nd, Er or Tm.

30. An X-ray detector, wherein the scintillator layer as claimed in claim 19 has been applied to a substrate provided with a photodiode array.

31. The scintillator layer as claimed in claim 19, wherein the plate is made from an epoxy resin.

* * * * *